(12) United States Patent
Joseph

(10) Patent No.: US 8,995,907 B2
(45) Date of Patent: Mar. 31, 2015

(54) DATA COMMUNICATION SYSTEM

(75) Inventor: Joseph C. Joseph, Houston, TX (US)

(73) Assignee: Baker Hughes Incorporated, Houston, TX (US)

(*) Notice: Subject to any disclaimer, the term of this patent is extended or adjusted under 35 U.S.C. 154(b) by 318 days.

(21) Appl. No.: 13/168,105

(22) Filed: Jun. 24, 2011

(65) Prior Publication Data

US 2012/0329387 A1 Dec. 27, 2012

(51) Int. Cl.
H04B 5/00 (2006.01)
E21B 17/02 (2006.01)

(52) U.S. Cl.
CPC ............ *H04B 5/0031* (2013.01); *E21B 17/028* (2013.01); *H04B 5/0081* (2013.01)
USPC ........................................ 455/41.1; 455/41.2

(58) Field of Classification Search
CPC ......... G01V 3/28; E21B 44/00; E21B 47/022; E21B 47/024; E21B 7/04; E21B 10/43
USPC ...................... 455/41.1, 41.2, 41.3, 42, 43, 44
See application file for complete search history.

(56) References Cited

U.S. PATENT DOCUMENTS

| 4,814,676 | A | * | 3/1989 | Van Hout .................. 318/400.11 |
| 4,884,971 | A | | 12/1989 | Chan et al. |
| 4,914,433 | A | | 4/1990 | Galle |
| 7,064,676 | B2 | | 6/2006 | Hall et al. |
| 2008/0007422 | A1 | | 1/2008 | Hudson |
| 2009/0039875 | A1 | * | 2/2009 | Hoshino .................. 324/207.21 |
| 2010/0068998 | A1 | * | 3/2010 | Zyambo et al. ............. 455/41.1 |
| 2012/0168519 | A1 | * | 7/2012 | Baxter et al. .................. 235/492 |
| 2012/0223699 | A1 | * | 9/2012 | Holman et al. ............ 324/207.2 |

OTHER PUBLICATIONS

T.R. McJunkin et al.; "Observations on Characterization of Defects in Coiled Tubing from Magnetic-Flux Leakage Data"; SPE/ICoTA Coiled Tubing Conference & Exhibition; Apr. 4-5, 2006, Texas.

* cited by examiner

*Primary Examiner* — Ping Hsieh
(74) *Attorney, Agent, or Firm* — Cantor Colburn LLP

(57) ABSTRACT

A system for communicating between a first unit and a second unit without a physical connection, the system including a magnetic element for creating a magnetic field, a sensor operatively arranged to detect changes in the magnetic field, and a driver operatively arranged to alter the magnetic field detected by the sensor in accordance with a first signal, the first signal operatively arranged to transmit data independent of an amplitude of the first signal, the sensor generating a second signal in response to changes in the magnetic field, the second signal representative of the first signal.

19 Claims, 3 Drawing Sheets

DATA COMMUNICATION SYSTEM

BACKGROUND

Mating communication lines is often difficult in the downhole drilling and completions industry, particularly when establishing electrical wet connections downhole. Accordingly, various techniques and systems have been devised to enable communication along a tubulars in a borehole in order to control downhole equipment, monitor downhole conditions, etc. The industry is accordingly receptive to new configurations that enable data communication, particularly those that enable communication without the need for physical connections.

BRIEF DESCRIPTION

A system for communicating between a first unit and a second unit without a physical connection, the system including a magnetic element for creating a magnetic field, a sensor operatively arranged to detect changes in the magnetic field, and a driver operatively arranged to alter the magnetic field detected by the sensor in accordance with a first signal, the first signal operatively arranged to transmit data independent of an amplitude of the first signal, the sensor generating a second signal in response to changes in the magnetic field, the second signal representative of the first signal.

A system for communicating between a first unit and a second unit without a physical connection, the system including a magnetic element for creating a magnetic field, a sensor operatively arranged to detect changes in the magnetic field, the sensor including a first sensing axis and a second sensing axis for sensing changes in the magnetic field in two substantially perpendicular directions, and a driver operatively arranged to alter the magnetic field detected by the sensor in accordance with a first signal, the sensor generating a second signal in response to changes in the magnetic field, the second signal comprising a first component signal and a second component signal and representative of the first signal.

A method of communicating data between a first unit and a second unit without a physical connection, the method including providing a first signal, the first signal operatively arranged to transmit data independent of an amplitude of the first signal, providing a magnetic element for creating a magnetic field, providing a sensor in the magnetic field, altering the magnetic field detected by the sensor with a driver in accordance with the first signal, detecting changes in the magnetic field with the sensor, and generating a second signal with the sensor in response to detected changes in the magnetic field, the sensor operatively arranged to detect the changes in the magnetic field regardless of a relative orientation of the sensor with the magnetic element such that the second signal is representative of the first signal.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

Figure 1:
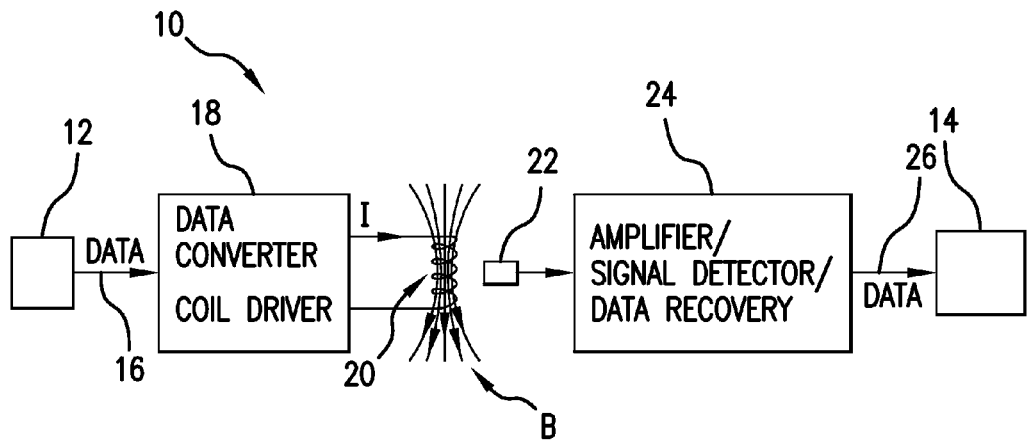
FIG. 1 schematically illustrates a data communication system according to an embodiment described herein.

Referring now to the drawings, FIG. 1 schematically illustrates a system 10 for enabling data communication between a transmitting unit 12 and a receiving unit 14 without a physical connection. A data input line 16 receives an input signal from the transmitting unit 12. The data input line 16 can be arranged for transmitting data in any desired form. For example, the data could be transmitted as a binary digital signal, a frequency modulated (FM) signal, a Differential Manchester encoded signal, a frequency-shift keyed signal, a series of current pulses, a series of light pulses, etc. Thus, the data input line 16 is shown for schematic purposes only and may take an intangible form, e.g., a wireless signal. Accordingly, the transmitting unit 12 could be any device capable of sending any digital or analog communication, such as instructions, values, parameters, sounds, images, video, information, etc., hereinafter referred to generally as "data", the "input signal" or the "data signal". The data of the transmitting unit 12 could be manipulated or entered manually by a user (e.g., via a keyboard, keypad, pointing device, etc.) or could be generated automatically in response to conditions or situations that are measured, calculated, recorded, captured, determined, etc., via sensors, cameras, tools, gauges, etc.

The data from the input line 16 is communicated to a driver 18. In the embodiment of FIG. 1, the driver 18 is a driver circuit for controlling a magnetic element, which takes the form of a conductive coil 20 in FIG. 1. In this embodiment, the driver 18 is arranged to regulate a current I through the coil 20 for producing a magnetic field B when the current is run therethrough. The current is set in response to the data signal in order to regulate a magnetic flux density or strength of a magnetic field B (with larger currents resulting in stronger magnetic fields). In one embodiment, the driver 18 energizes the coil 20 with alternating current such that the coil 20 produces alternating magnetic flux lines (e.g., flux lines that repeatedly switch direction over time) having a strength corresponding to a property of the data signal received from the input line 16. For example, the property of the data signal that determines the current, and therefore the strength or density of the magnetic field B, could be frequency, amplitude, etc., as described in more detail below.

The driver 18 converts the data received from the input line 12 into current usable by the coil 20 to create the magnetic field. By convert, it is meant that a signal of a first type is received and a signal of a second type is output. Thus, the driver 18 could take any type of data signal and modify it into any type of signal usable by a magnetic element, in this case, the coil 20. In some embodiments, the driver 18 and the transmitting unit 12 could be combined as a single unit if the input data signal does not need to be converted, i.e., it is already in a form usable by the magnetic element. In one embodiment, the driver 18 supplies more current during periods of the data signal having larger amplitudes or less current during periods of the data signal having smaller amplitudes. As noted above, alternating current could be used to alternate the direction of the magnetic flux lines of the magnetic field. According to the above, the amplitude or other property of the data signal could be used by the driver 18 to set the current through the coil 20 on-the-fly or in real time in response to the input signal. As another example, the frequency of the current output by the driver 18 could be set to match the frequency of the signal, thereby ignoring amplitude. This would be particularly useful for signals that transmit data independent of amplitude, such as a frequency modulated (FM) input signal, a Differential Manchester encoded signal, a frequency-shift keyed signal, etc. As another example, the driver 18 could be arranged to receive an FM signal and supply a larger current in response to a higher frequency signal or a smaller current in response to a lower frequency data signal. In any case, the driver circuit 18 could be specifically designed to receive the data signal and convert the data into a corresponding current that is run through the coil 20, where the current represents the original signal, such as in amplitude, frequency, or both.

A sensor 22 is positioned within the magnetic field B that is produced by the coil 20. Generally, the sensor 22 takes the form of any sensor or magnetometer that can sense changes in direction or strength of a magnetic field. For example, the sensor could take the form of a Hall-effect sensor that alters its output voltage in response to detected changes in magnetic field. Regardless of the particular configuration, the sensor 22 generates a signal (e.g., current, voltage, etc.) in response to the strength of the magnetic field detected by the sensor 22. The signal is output to a data recovery module 24. The data recovery module 24 converts the signal from the sensor 20 back into a data signal, which is then output via an output line 26 to the receiving unit 14. That is, the data recovery module 24 could work similarly to the driver 18 in that the module 24 takes a signal and converts it into a signal of a different type. For example, the module 24 could receive a voltage signal that fluctuates positively and negatively with respect to ground in accordance with alternating magnetic field flux lines, and be arranged to detect each time the voltage crosses zero, and use the frequency of those zero crossings to output an FM signal having the same frequency. Of course, the use of zero crossings could be similarly utilized for transmitting other data signals that are independent of amplitude, and are instead defined by frequency. The module 24 may also be arranged as an amplifier or otherwise arranged to amplify the signal as desired, as will be explained further below.

Figure 2:
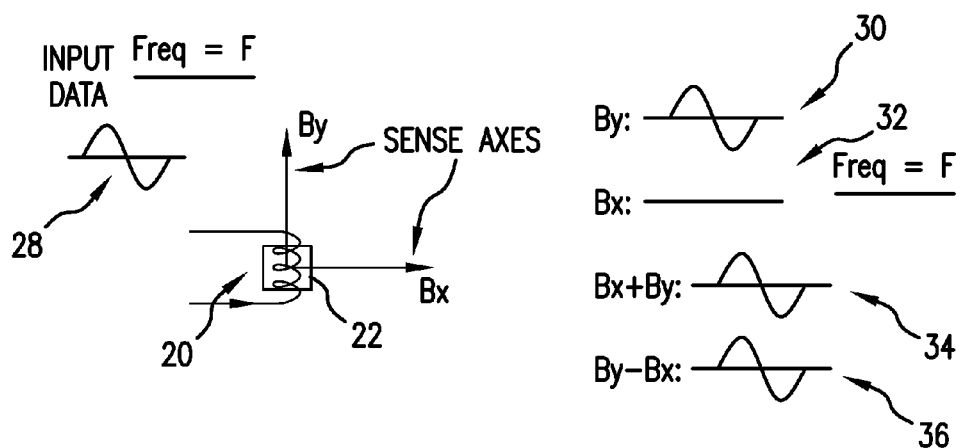
FIGS. 2-5 schematically illustrate various relative positions for a sensor and a coil.

FIGS. 2-5 illustrate various positions of the sensor 22 with respect to the coil 20, which can be instructive for use of the system 10 and module 24. In these embodiments, the sensor 22 is a multi-axis sensor, capable of sensing changes in magnetic field in two substantially perpendicular directions, as represented by a set of axes Bx and By. Thus, the sensor 22 could be a single bi-axial sensor, or could be arranged as two separate uni-axial sensors arranged perpendicularly to each other. Advantageously, as will be appreciated in view of the below, the bi-axial arrangement enables some embodiments to essentially ignore the relative orientation of the sensor 22 with respect to the coil 20, such as with respect to rotation, tilt, etc. In FIG. 2, the coil 20 is aligned in the direction of the axis By. The coil 20 produces a magnetic field in response to the current supplied by the driver 18. The driver 18 is supplied with a data signal 28, substantially resembling a sinusoidal wave of a given amplitude and frequency, which could be analog or digital. Accordingly, the driver circuit 18 regulates current through the coil 20 to correspond to the amplitude of the signal 28 in essentially real time as the signal 28 is received, which therefore also corresponds to the frequency of the input signal 28. A voltage signal 30 is output by the sensor 22 in response to the changes in the magnetic field with respect to the sensing axis By that occurred as a result of the regulation of the current by the driver 18 in order to reflect the input data signal 28. Since the coil 20 is aligned along the axis By, no voltage signal was generated with respect to the axis Bx, as represented by a line 32. In order to account for slight shifts or misalignments between the coil 20 and the sensor 22, obtain a stronger or more accurate signal, etc., a composite signal 34 or 36, could be produced, for example by the data recovery module 24, as the sum or difference, respectively, of the two voltage signals 30 and 32 in order to form the strongest output signal, e.g., an output signal having a maximum amplitude.

Figure 3:
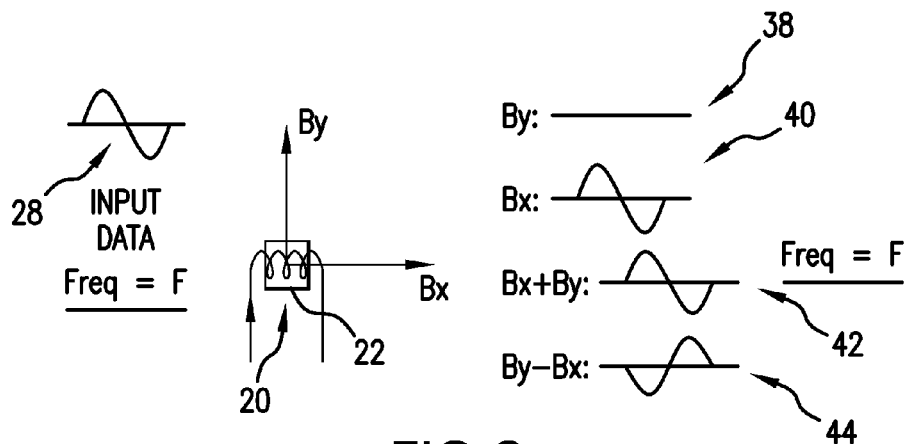

In FIG. 3, the coil 20 is aligned in the direction of the axis Bx. The coil 20 again produces a magnetic field in response to the current supplied by the driver 18. The driver circuit 18 is supplied with the data signal 28, which again substantially resembles a sinusoidal wave of a given amplitude and frequency. Accordingly, the driver circuit 18 regulates current through the coil 20 to match the amplitude of signal 28 as the signal 28 is received. Since the coil 20 is aligned along the axis Bx, no voltage signal is generated with respect to the axis By, as represented by a line 38. A voltage signal 40 is output by the sensor 22 in response to the changes in the magnetic field that occurred along sensing axis Bx as a result of the regulation of the current by the driver 18 to match the input signal 28. A composite signal 42 or 44 could be produced, for example by the data recovery module 24, as the sum or difference, respectively, of the two voltage signals 38 and 40.

Figure 4:
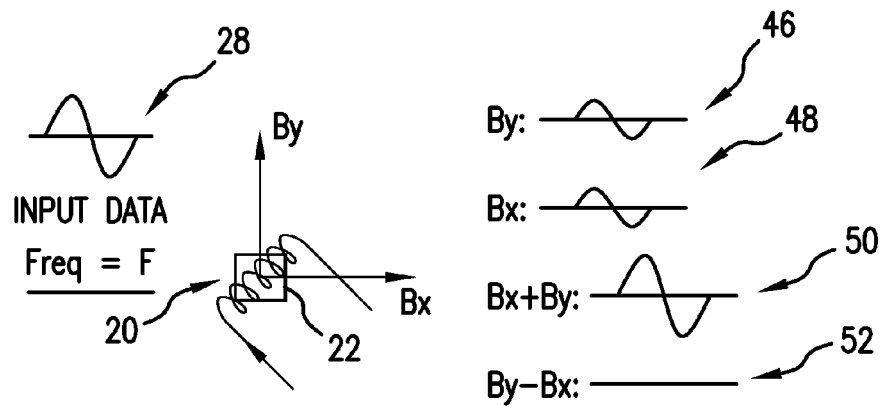
Figure 5:
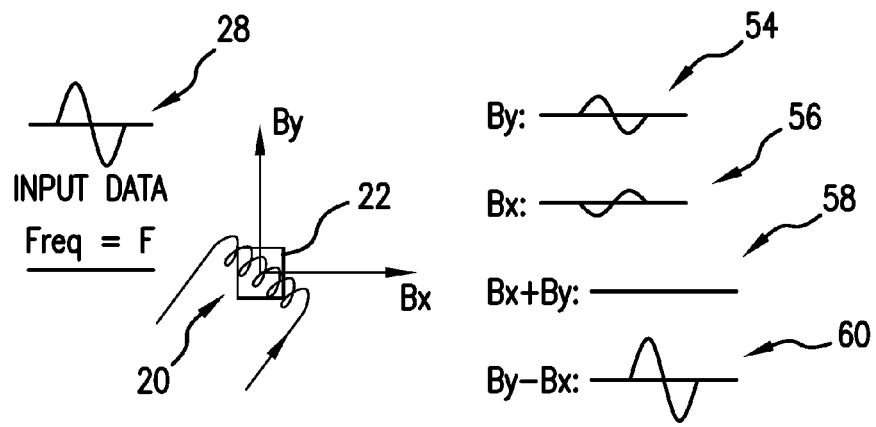

In FIG. 4, the coil 20 is aligned bisecting the axes Bx and By, in the positive direction of both axes. The coil 20 again produces a magnetic field in response to current through the coil, as regulated by the driver circuit 18. The driver circuit 18 is supplied with the data signal 28, which again substantially resembles a sinusoidal wave of a given amplitude and frequency. Since the coil 20 is aligned directly between the axes Bx and By, a y-component signal 46 and an x-component signal 48 are substantially equal to each other, both having the same frequency as the input signal 28, but only half of the amplitude of the input signal 28. A composite signal 50 or 52 could be produced, for example by the data recovery module 24, as the sum or difference, respectively, of the two voltage signals 46 and 48. In this example, the summed signal 50 now substantially matches the original data signal 28 in both frequency and amplitude, even though the component signals 46 and 48 did not. Accordingly, it is to be understood that the module 24 could be arranged to take the strongest signal, with respect to amplitude, that results from sums of, or differences between, voltages in order to recreate an output signal that most closely resembles the input signal.

In FIG. 5, the coil 20 is again aligned bisecting the axes Bx and By, but is directed in the positive x-direction and negative y-direction. The coil 20 again produces the magnetic field in response to current through the coil, which current is regulated by the driver circuit 18. The driver circuit 18 is supplied with the data signal 28, which again substantially resembles a sinusoidal wave of a given amplitude and frequency. Since the coil 20 is aligned directly between the axes Bx and By, but directed positively in the y-direction and negatively in the x-direction, a y-component signal 54 and an x-component signal 56 are substantially completely out of phase with each other, with both having the same frequency as the input signal 28, but only half of the amplitude of the input signal 28. A composite signal 58 or 60 could be produced, for example by the data recovery module 24, as the sum or difference, respectively, of the two voltage signals 54 and 56. In this example, the summed signal 52 would produce no signal at all. Accordingly, it is to be appreciated that the data recovery module may be arranged to take a difference between the two signals, in order to recreate an output signal matching the input signal.

Of course, other amplification, conversion, and other data recovery techniques could be applied to generate a more accurate output signal.

It is to be appreciated that all of the above embodiments, such as with an FM signal, or a multi-axis sensor, the relative position, orientation (tilt, rotation, etc.) of the sensor 22 with respect to the coil 20 or other magnetic element is largely irrelevant. For example, the data recovery module 24 could identify the frequency of the output signal of the sensor 22 by detecting zero-crossings, as noted above. In such an event, the amplitude would be relatively unimportant in comparison to the embodiments of FIGS. 2-5.

Figure 6:
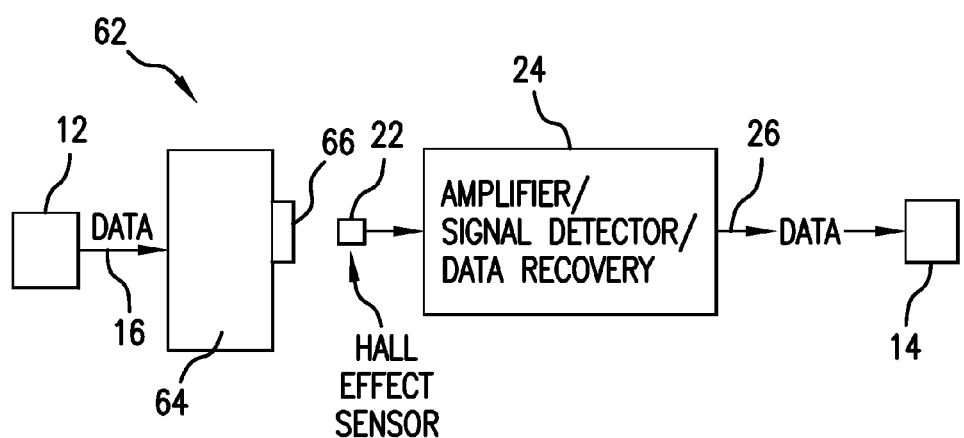
FIG. 6 schematically illustrates a data communication system according to another embodiment described herein.

Further embodiments are also within the scope of the current invention. For example, the driver 18 could take the form of any device that can drive (e.g., that can move, set, determine, control, regulate) another device, such as electrical circuits, motors, actuators, hydraulics, pneumatics, etc. Thus, for example, mechanical signals could be used to communicate an input signal in a manner similar to the above. For example, a system 62 in FIG. 6 includes a driver 64 (in lieu of the driver 18) with a magnetic element 66 attached thereto (in lieu of the coil 20). The driver 64 could accordingly be a motor, actuator, etc., for rotating, tilting, translating, or otherwise setting a position of the magnetic element 66 with respect to the sensor 22 in response to an input signal received by the driver. For example, the driver 64 could be arranged to alternatingly rotate the magnetic element 66 clockwise and counter-clockwise, or to alternatingly actuate the magnetic element 66 forward and backward, in response to the input signal (e.g., with the amplitude of the input signal setting the rotational or linear distance the driver 64 positions the magnetic element 66 from a predetermined reference point). In addition, the driver 64 could be a physical body (e.g., a tubular, a tool, a gauge, etc.) that experiences vibrations from an external source, and the input signal comprises the vibrations (e.g., to help predict the life of the tool, gauges, etc.). The magnetic element 66 could be, for example, a permanent magnet, a coil having a constant current running therethrough, or any other device or mechanism for creating a magnetic field. By physically changing the position of the magnetic element 66 with respect to the sensor 22, the sensor 22 can perceive changes in the magnetic field even if the strength of the field remains constant, and thus, the sensor 22 can operate for the system 62 essentially exactly as described above with respect to the system 10. Alternatively, the driver 64 could be coupled to the sensor 22 for changing a position of the sensor 22, but in either case, would be arranged to alter the relative position between the sensor 22 and the magnetic element 66. For example, it is to be appreciated that FIGS. 2-5 provide guidance on how the relative position of the magnetic element (e.g., the coil 20) with respect to the sensor 22 will affect the output of the sensor 22.

Figure 7:
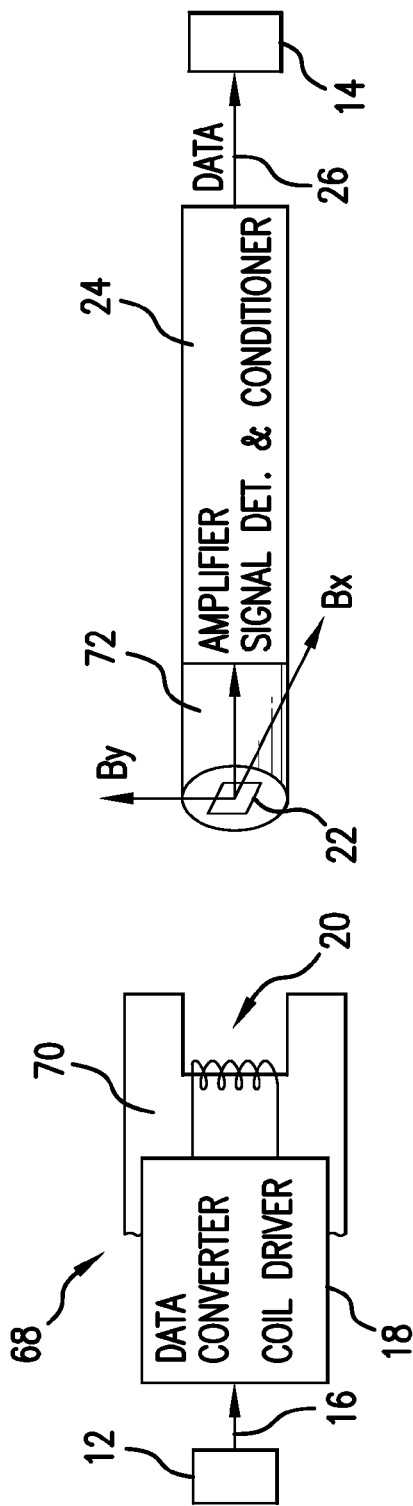
FIG. 7 schematically illustrates a data communication system according to another embodiment described herein.
Figure 8:
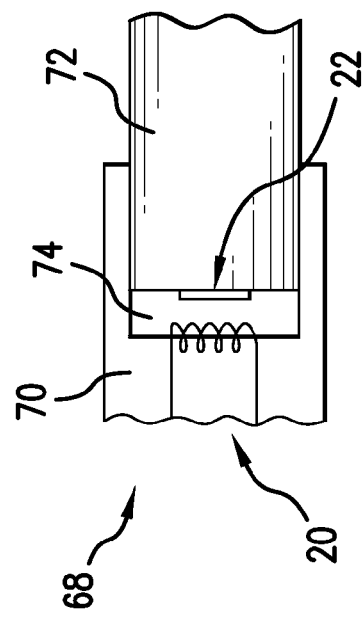
FIG. 8 schematically illustrates an enlarged view of a gap formed between communication components in the system of FIG. 7.

One application of the currently described embodiments is for enabling communications along a tubular string in a borehole drilling operation. Accordingly, FIGS. 7 and 8 illustrate an assembly 68 having a first tubular 70 and a second tubular 72. The tubular 70 includes a magnetic element, specifically illustrated as the coil 20, proximate an end thereof, while the tubular 72 has the sensor 22 arranged proximate an end thereof. The driver 18 (or the driver 64) could be installed at the surface proximate the borehole, or anywhere along the length of the tubular 70, as desired. The tubular 70 could be located downhole of the tubular 72 or vice-versa. As shown in FIG. 8, when the tubulars 70 and 72 are engaged, a gap 74 is present between the coil 20 and the sensor 22. Thus, while the coil 20 and the sensor 22 are not physically connected, they are capable of communicating data in accordance with the above-described embodiments. For example, the assembly 68 could be advantageously used between two tubulars that are located downhole and are difficult to connect, must be decoupled, repeatedly connected, etc. Again, it is to be appreciated that the driver 18 could be replaced with another type of driver (e.g., electrical, mechanical, hydraulic, pneumatic, etc.), the coil 20 could be replaced with other magnetic elements (e.g., permanent magnet, coil having constant current run therethrough, etc.), the sensor 22 could be any magnetometer or other sensor capable of detecting changes in a magnetic field, or any other such modifications could be made to the embodiment of FIGS. 7 and 8.

While the invention has been described with reference to an exemplary embodiment or embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the claims. Also, in the drawings and the description, there have been disclosed exemplary embodiments of the invention and, although specific terms may have been employed, they are unless otherwise stated used in a generic and descriptive sense only and not for purposes of limitation, the scope of the invention therefore not being so limited. Moreover, the use of the terms first, second, etc. do not denote any order or importance, but rather the terms first, second, etc. are used to distinguish one element from another. Furthermore, the use of the terms a, an, etc. do not denote a limitation of quantity, but rather denote the presence of at least one of the referenced item.

What is claimed is:

1. A system for communicating between a first downhole unit and a second downhole unit without a physical connection, the system comprising:
    a magnetic element for creating a magnetic field, the magnetic element disposed at the first downhole unit;
    a sensor operatively arranged to detect changes in the magnetic field, the sensor disposed at the second downhole unit, the sensor configured to be positioned within the magnetic field when the first downhole unit is physically coupled to the second downhole unit; and,
    a driver operatively arranged to alter the magnetic field by changing a position of the magnetic element relative to the sensor in accordance with a first signal, the first signal operatively arranged to transmit data, the sensor configured to be positioned within the magnetic field and generate a second signal in response to changes in the magnetic field, the second signal representative of the first signal.

2. The system of claim 1, wherein a frequency of the first and second signals is detected by observing zero-crossings of the first and second signals.

3. The system of claim 1, wherein the first signal utilizes frequency modulation, Differential Manchester encoding, frequency-shift keying, or combinations including at least one of the foregoing.

4. The system of claim 1, wherein the driver is coupled to the magnetic element to change the position of the magnetic element in response to the first signal at a first downhole component, and the sensor is configured to generate the second signal at a second downhole component.

5. The system of claim 1, wherein the magnetic element is a conductive coil, and the driver is a circuit for regulating a current through the conductive coil, the current corresponding to the first signal.

6. The system of claim 5, wherein the coupling arrangement includes a first coupler of the first unit and a second coupler of the second unit, the first and second couplers forming a gap between the magnetic element and the sensor when the first unit is engaged with the second unit.

7. The system of claim 1, wherein the magnetic element is configured to produce a constant magnetic field.

8. The system of claim 1, wherein the relative position is set by at least one of rotation and translation.

9. The system of claim 1, wherein the system is configured to transmit data along a borehole string in an earth formation by transmitting the data from the first unit to the second unit.

10. The system of claim 1, wherein the driver is a body disposed in a borehole in an earth formation that experiences vibrations, and changes the position of the magnetic element based on the vibrations.

11. The system of claim 1, wherein the second signal is not a same type as the first signal, the system further comprising a data recovery module operatively arranged to convert the second signal into a third signal, the third signal the same type as the first signal and substantially resembling the first signal.

12. The system of claim 1, wherein the second signal is a voltage signal.

13. A system for communicating between a first downhole unit and a second downhole unit without a physical connection, the system comprising:
    a magnetic element for creating a magnetic field, the magnetic element disposed at the first downhole unit;
    a sensor operatively arranged to detect changes in the magnetic field, the sensor including a first sensing axis and a second sensing axis for sensing changes in the magnetic field in two substantially perpendicular directions, the sensor disposed at the second downhole unit, the sensor configured to be positioned within the magnetic field when the first downhole unit is physically coupled to the second downhole unit; and
    a driver operatively arranged to alter the magnetic field by changing a position of the magnetic element relative to the sensor in accordance with a first signal, the sensor configured to be positioned within the magnetic field and generate a second signal in response to changes in the magnetic field, the second signal comprising a first component signal and a second component signal and representative of the first signal.

14. The system of claim 13, further comprising a module for outputting a composite signal, the composite signal generated by taking, with respect to amplitude, a stronger of a sum of the first and second component signals and a difference between the first and second component signals.

15. A method of communicating data between a first downhole unit and a second downhole unit without a physical connection, the method comprising:
    providing a first signal, the first signal operatively arranged to transmit data;
    providing a magnetic element at the first downhole unit for creating a magnetic field;
    providing a sensor at the second downhole unit and positioning the sensor within the magnetic field, the sensor positioned within the magnetic field when the first downhole unit is physically coupled to the second downhole unit;
    altering the magnetic field by changing a position of the magnetic element relative to the sensor with a driver in accordance with the first signal;
    detecting changes in the magnetic field with the sensor; and
    generating a second signal with the sensor in response to detected changes in the magnetic field, the sensor operatively arranged to detect the changes in the magnetic field regardless of a relative orientation of the sensor with the magnetic element such that the second signal is representative of the first signal.

16. The method of claim 15, further comprising observing zero-crossings of the second signal in order transmit data contained in the first signal to a receiving unit.

17. The method of claim 16, wherein the first signal utilizes frequency modulation, Differential Manchester encoding, frequency-shift keying, or combinations including at least one of the foregoing.

18. The method of claim 15, wherein the sensor is provided with a first sensing axis and a second sensing axis for sensing changes in the magnetic field in two substantially perpendicular directions, the second signal comprising a first component signal and a second component signal.

19. The method of claim 18, further comprising converting the second signal into a third signal with a data recovery module by determining a maximum signal, with respect to amplitude, from a sum of the first and second component signals and a difference between the first and second component signals.

* * * * *